(12) United States Patent
Boinais et al.

(10) Patent No.: US 10,632,710 B2
(45) Date of Patent: Apr. 28, 2020

(54) LASER ENGRAVED COMPOSITE PANEL WITH NATURAL FIBERS

(71) Applicant: Faurecia Interior Systems, Inc., Auburn Hills, MI (US)

(72) Inventors: Olivier Boinais, West Bloomfield, MI (US); Maxime Salandre, Rochester, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 192 days.

(21) Appl. No.: 15/812,691

(22) Filed: Nov. 14, 2017

(65) Prior Publication Data

US 2019/0143630 A1    May 16, 2019

(51) Int. Cl.
| | |
|---|---|
| *B32B 3/10* | (2006.01) |
| *B32B 3/26* | (2006.01) |
| *B32B 27/08* | (2006.01) |
| *B32B 27/32* | (2006.01) |
| *B32B 37/18* | (2006.01) |
| *B32B 27/20* | (2006.01) |
| *B32B 38/00* | (2006.01) |
| *B32B 33/00* | (2006.01) |
| *B32B 38/10* | (2006.01) |

(52) U.S. Cl.
CPC .............. *B32B 3/263* (2013.01); *B32B 27/08* (2013.01); *B32B 27/20* (2013.01); *B32B 27/32* (2013.01); *B32B 33/00* (2013.01); *B32B 37/182* (2013.01); *B32B 38/0008* (2013.01); *B32B 38/10* (2013.01); *B32B 2310/0843* (2013.01); *B32B 2323/10* (2013.01); *B32B 2605/003* (2013.01)

(58) Field of Classification Search
None
See application file for complete search history.

(56) References Cited

U.S. PATENT DOCUMENTS

| | | | |
|---|---|---|---|
| 4,861,620 A | 8/1989 | Azuma et al. | |
| 4,947,022 A | 8/1990 | Ostroff et al. | |
| 5,709,925 A * | 1/1998 | Spengler | B29C 70/021 |
| | | | 428/198 |
| 5,862,845 A | 1/1999 | Chin et al. | |
| 8,071,912 B2 | 12/2011 | Costin, Sr. et al. | |
| 8,974,016 B2 | 3/2015 | Costin, Sr. et al. | |
| 2005/0006019 A1 | 1/2005 | Ratcliffe | |
| 2009/0071941 A1 | 3/2009 | Knoblauch et al. | |
| 2011/0260359 A1 | 10/2011 | Durand et al. | |

(Continued)

FOREIGN PATENT DOCUMENTS

| | | |
|---|---|---|
| DE | 102012012470 A1 | 12/2013 |
| WO | WO2016098359 A1 | 6/2016 |

*Primary Examiner* — Christopher M Polley
(74) *Attorney, Agent, or Firm* — Reising Ethington P.C.

(57) ABSTRACT

A vehicle interior panel includes an engraved image at a decorative side of the panel. The image is produced by selectively removing a film layer from a compression molding to expose an underlying surface of a substrate layer in a desired pattern. The substrate layer is formed from a composite material including natural fibers. A laser beam is configured to remove the film layer and to cauterize the natural fibers along the pattern. The cauterization has an anti-aging effect on the natural fibers by increasing color stability and water resistance of the exposed composite material.

16 Claims, 2 Drawing Sheets

(56) References Cited

U.S. PATENT DOCUMENTS

| | | | |
|---|---|---|---|
| 2011/0281076 A1* | 11/2011 | Anderson | ............... B32B 9/02 428/165 |
| 2012/0247654 A1 | 10/2012 | Piccin et al. | |
| 2014/0342119 A1 | 11/2014 | Kastell et al. | |

* cited by examiner

LASER ENGRAVED COMPOSITE PANEL WITH NATURAL FIBERS

TECHNICAL FIELD

The present disclosure relates generally to vehicle interior panels and is particularly pertinent to vehicle interior panels that include a natural fiber composite material.

BACKGROUND

Trends toward use of renewable resources in the automotive industry have led to development of natural fiber composite materials, such as plant fiber-reinforced plastics. These materials seek to replace the reinforcing components of traditional polymer composites, such as glass fibers, with natural or biologically produced fibers from plant or animal sources. Natural fiber composites have been limited to use as non-visible light-duty structural materials in automotive applications, due in large part to the chemical instability of the natural fiber component when exposed to sunlight and to the elevated temperatures sometimes experienced in a vehicle passenger cabin. Unlike synthetic polymers, the naturally occurring substances contained in natural fibers, such as cellulose, lignin, and proteins, cannot simply be blended with synthetic UV- or heat-stabilizing additives to improve their environmental stability.

Conventional laser processing of wood-based materials involves directing a laser beam directly onto a wood surface and removing wood material by burning or ablation. For example, U.S. Pat. No. 5,862,845 to Chin et al. teaches a method of removing material from piece of wood using an ultrafast pulsed laser with sub-nanosecond laser pulses. Use of ultrashort laser pulses is said to enable sanding, cutting, or carving of the wood without burning or damaging the cells of the wood material.

SUMMARY

In accordance with various embodiments, there is provided a method of making an interior panel of a vehicle. The interior panel has a decorative side that faces an interior of a passenger cabin of the vehicle when installed in the vehicle. The method includes the step of providing a panel comprising a substrate layer and a film layer bonded to the substrate layer. The substrate layer is formed from a composite material comprising natural fibers dispersed in a polymeric matrix material. The method includes the step of directing a laser beam at the film layer and along a pattern defined along the panel to locally remove an entire thickness of the film layer from the panel and expose a surface of the substrate layer along the pattern to thereby form the decorative side of the interior panel. The laser beam is configured to cauterize the natural fibers at the exposed surface of the substrate layer.

In some embodiments, the natural fibers are plant fibers having an elongated shape, and the matrix material is a thermoplastic material.

In some embodiments, the natural fibers are bast fibers ranging in length from 30 mm to 150 mm.

In some embodiments, the matrix material comprises a polyolefin and the film layer comprises the polyolefin.

In some embodiments, the film layer has a thickness in a range from 50 µm to 300 µm and less than 10% of a thickness of the provided panel.

In some embodiments, the substrate layer has a thickness along the pattern before the step of directing the laser beam at the film layer and has the same thickness along the pattern after the step of directing the laser beam at the film layer.

In some embodiments, the provided panel is a compression molded panel.

In some embodiments, the method includes compression molding the substrate layer from a flat sheet of material comprising the natural fibers and the matrix material and bonding the film layer to the substrate layer by hot compression.

In some embodiments, the laser beam is delivered to the panel in pulses that are each longer than a microsecond.

In some embodiments, the natural fibers are present in the composite material in an amount from 40% to 60% by weight, and the polymeric matrix material is present in the composite material in an amount from 40% to 60% by weight.

In some embodiments, the natural fibers at one portion of the exposed surface are cauterized to a greater degree than at another different portion of the exposed surface.

In accordance with various embodiments, an interior panel of a vehicle includes a substrate layer, a film layer bonded to the substrate layer, and a cut-out formed through the film layer in a pattern. The substrate layer is formed from a composite material comprising natural fibers dispersed in a polymeric matrix material. The film layer has a decorative side that faces away from the substrate layer and that is visible in an interior of a passenger cabin of the vehicle when the interior panel is installed in the vehicle. The substrate layer has a visible portion located in and visible through the cut-out, and the natural fibers of the composite material are cauterized at the visible portion.

In some embodiments, the pattern is not an imitation of a naturally occurring pattern.

In various embodiments, the interior panel includes one or more of the following features:
- the substrate layer and the film layer together form a compression molded layer having generally parallel opposite faces,
- the matrix material is a thermoplastic material and is present in the composite material in an amount from 40% to 60% by weight,
- the natural fibers are bast fibers and are present in the composite material in an amount from 40% to 60% by weight and range in length from 50 mm to 150 mm,
- the film layer is formed from a thermoplastic material and has a thickness in a range from 50 µm to 300 µm and less than 10% of a thickness of the compression molded layer,
- the thermoplastic material of the matrix material and the thermoplastic material of the film layer are polypropylene-based materials.
- the substrate layer includes oppositely facing first and second sides, the film layer is bonded to the first side of the substrate layer so that the decorative side of the film layer faces the interior of the passenger cabin, and no film layer is bonded to the second side of the substrate layer.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

DESCRIPTION OF THE DRAWINGS

One or more embodiments will hereinafter be described in conjunction with the appended drawings, wherein like designations denote like elements, and wherein.

DETAILED DESCRIPTION OF EMBODIMENT(S)

Described below is a vehicle interior panel including an engraved graphic image that can be produced by selectively removing a layer of a multilayer material. Natural fibers in an underlying layer can be cauterized during a laser material removal process to provide increased color stability and water resistance to the natural fiber-containing layer. In embodiments disclosed below, a laser beam is configured both to selectively remove material from the surface of a compression molded and laminated composite material and to cauterize the natural fibers of the exposed material. The disclosure is applicable to any type of product that includes natural fibers.

Figure 1:
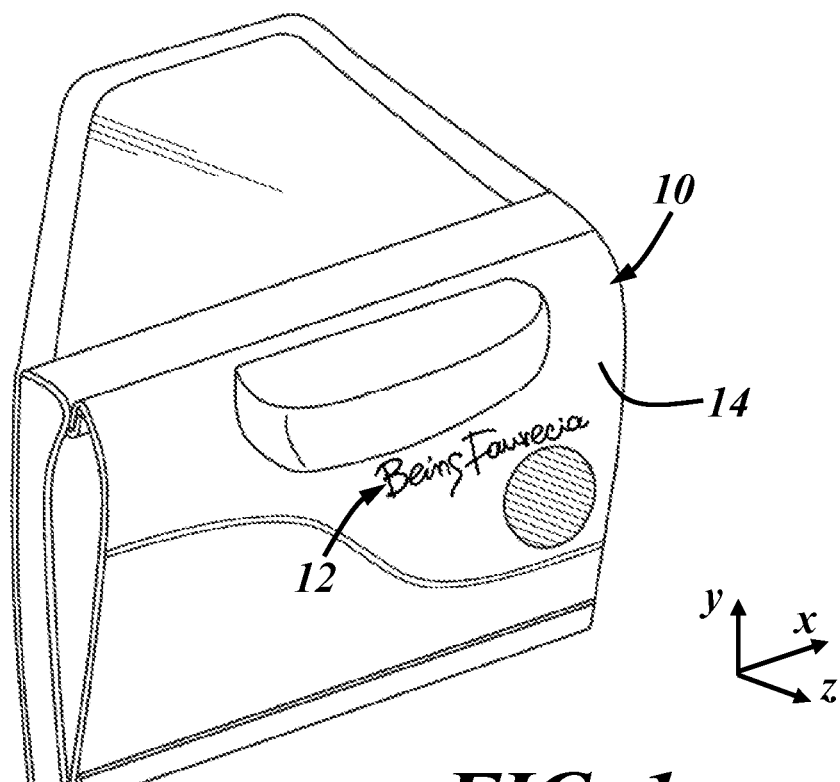
FIG. 1 is a perspective view of an interior side of a vehicle door including a laser-engraved interior panel.

FIG. 1 is a perspective view of an interior side of a vehicle door, including an interior panel 10 having a graphic image 12 engraved on a decorative side 14 of the panel, which faces an interior of a passenger cabin of a vehicle and is visible when installed in the vehicle. In the illustrated example, the graphic image 12 includes stylized alphanumeric characters. In other examples, the graphic image includes a decorative pattern, an icon, a pictogram, a symbol, and/or a logo. In preferred embodiments, the graphic image is formed in a pattern that is recognizable as a human created design and is not an imitation of a naturally occurring pattern or texture such as a wood or leather grain or a randomly scratched or age-roughened surface, although it is possible to imitate such patterns with the disclosed method. While shown here on an interior door panel, the graphic image 12 can be engraved on any interior panel 10 of a vehicle, such as an instrument panel, glove box lid, console panel, steering wheel, pillar trim, floor panel or seat panel, to name a few examples. FIG. 1 includes a non-limiting reference frame in which the x-axis extends longitudinally forward and rearward with respect to the vehicle, the y-axis extends vertically upward and downward with respect to the vehicle, and the z-axis extends transversely left and right with respect to the vehicle.

Figure 2:
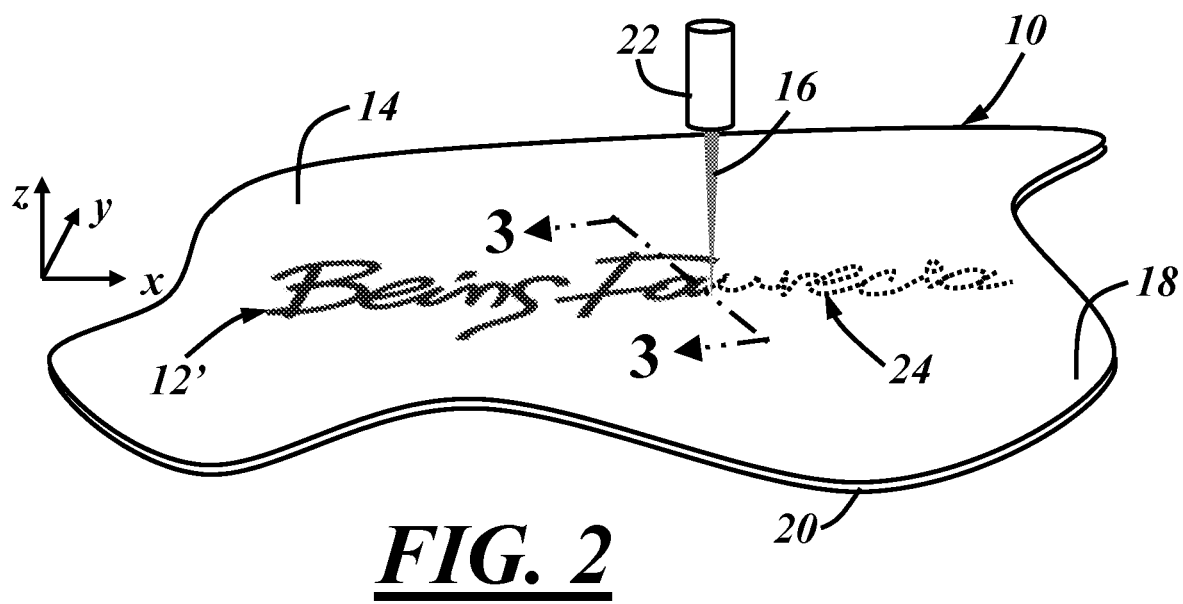
FIG. 2 is a perspective view of a portion of the interior panel of FIG. 1 during an exemplary method of making the panel.

FIG. 2 is a perspective view of a portion of the interior panel of FIG. 1 during an exemplary method of making the panel that uses a laser beam 16. Engraving is a material removal process, as opposed to a material additive process such as printing or applying an applique or overlay. As such, wherever material is removed from the panel 10, the thickness of the panel is reduced. The panel 10 has a multilayer construction, including a film layer 18 that defines a portion of the decorative side 14 of the panel and is bonded to an underlying substrate layer 20. In the illustrated example, the laser beam 16 is directed at the film layer 18 from a laser source 22. The laser source 22 generates and delivers the laser beam 16 to the panel with sufficient power density to vaporize, and thereby remove, material of the film layer 18 where the laser beam impinges the film layer. The laser beam 16 is directed along a pattern 24 defined along the panel 10 via relative movement of the laser beam and panel. FIG. 2 depicts the graphic image 12' only partially formed with the portion of the pattern 24 not yet exposed to the laser beam shown in broken lines.

Figure 3:
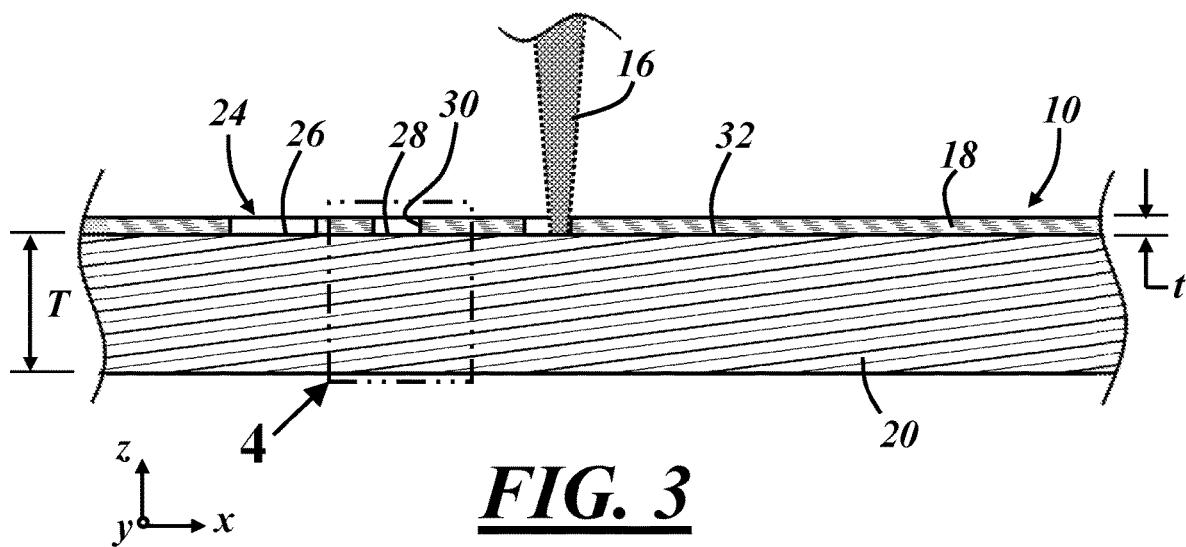
FIG. 3 is a cross-sectional view of the in-process panel of FIG. 2, illustrating a multilayer construction of the panel.

As shown in the cross-sectional view of FIG. 3, the laser beam 16 locally removes the entire thickness (t) of the film layer 18 from the panel 10 and exposes a surface 26 of the underlying substrate layer 20 along the pattern 24, thereby forming a visible portion 28 of the substrate layer in the finished interior panel. The visible portion 28 of the substrate layer 20 is visible through one or more cut-outs 30 formed through the film layer 18 where the film layer has been removed by the laser beam 16. A non-visible portion 32 of the substrate surface 26 remains covered by the film layer 18 away from the cut-outs 30. The visible portion 28 of the substrate layer 20 and the decorative side of the skin layer 18 may have respectively different or contrasting colors to make the graphic image suitably visible.

The film layer 18 may be a polymeric film formed from a polymeric material or polymer-based material, such as polypropylene or a polypropylene blend or alloy. In some embodiments, the film layer 18 is formed from a material comprising a polymeric material that is also present in the underlying substrate layer 20. The film layer 18 is preferably resistant to ultraviolet (UV) light and prevents UV light from passing through to the non-visible portion 32 of the substrate layer 20. The film layer 18 is also preferably scratch-resistant. In some cases, the film layer 18 is itself a multi-layer material and may include a clear or pigmented topcoat at the decorative side and/or a thin adhesive layer facing the substrate layer 20, for example. In some embodiments, the film layer is at least partially transparent to light within the visible spectrum. Partly transparent versions of the film layer may be tinted with a desired color. Non-limiting examples of ranges for the thickness (t) of the film layer include a range from 50 μm to 300 μm, and preferably a range from 60 μm to 250 μm. In a particular embodiment, the film layer has a nominal thickness of 120 μm or is in a range from 115 μm to 125 μm. In relative terms, the thickness of the film layer 18 is less than a thickness (T) of the substrate layer 20, such as in a range from 1% to 30%, from 5% to 20%, from 5% to 10%, or less than 10% of the thickness of the substrate layer.

The substrate layer 20 is formed from a composite material including a polymeric matrix material and natural fibers dispersed in the matrix material. The thickness (T) of the substrate layer 20 may be in a range from 0.5 mm to 5 mm and is preferably in a range from 1 mm to 3 mm or from 1.5 mm to 2.5 mm. The composite material may include the matrix material in an amount from about 40% to about 60% by weight and the natural fibers in an amount from about 40% to about 60% by weight. For example, the composite material may be 50% natural fibers and 50% matrix material by weight. Based on the relative densities of suitable natural fibers and matrix materials, the volumetric content of the natural fibers may be different from its corresponding weight percentage. The substrate layer 20 may itself include multiple layers. For example, the natural fiber-containing composite material may be backed by one or more other materials and/or layers.

The matrix material is preferably a thermoplastic material, but it may be at least partially cross-linked and/or contain thermoset constituents. In one embodiment, the matrix material comprises a polyolefin, such as polypropylene homopolymer or copolymer or a polypropylene blend or alloy. In some embodiments the matrix material comprises or is a thermoplastic polymer that is a major constituent of the skin layer 18 or is the same thermoplastic material as the skin layer.

Natural fibers are fibers from plant or animal sources, such as ligneous, cellulosic, lignocellulosic, or protein-based fibers. Examples of plant-derived fibers include wood fibers and bast fibers, such as jute, hemp, or flax fibers. Examples of animal-derived fibers include silk or wool. The natural fibers may be elongated in shape—i.e., having an aspect ratio greater than 1 and typically greater than 10. The average length of the natural fibers may generally be greater than the thickness (T) of the substrate layer 20 while the diameter of the natural fibers may generally be one or more orders of magnitude less than the thickness of the substrate layer. Exemplary ranges for the length of the natural fibers is from 30 mm to 150 mm, from 60 mm to 120 mm, or at least an order of magnitude greater than the thickness of the substrate layer. In a particular example, hemp fibers may have a diameter in a range from 15 μm to 50 μm, resulting in a fiber aspect ratio ranging from about 600 to about 10000.

Natural fibers may have certain characteristic limitations related to processing as part of a composite material. For instance, naturally occurring organic materials may have inherently less tolerance for high temperatures than their synthetic counterparts. Some natural fibers may at least partly degrade when exposed to the high temperatures of an injection molding process in which the polymeric matrix material is liquefied for high pressure injection into the mold, particularly with engineering polymers designed for high temperature applications. Thermoplastics on the lower end of the softening or melting range of plastic materials, such as the olefinic materials noted above, may thus be preferred as the matrix material. Also, non-injection molding processes such as compression molding may be preferred so that the matrix material is not required to be heated sufficiently high to reduce its viscosity for high pressure injection. Compression molding relies partly on mold clamping forces to shape the panel instead of relying entirely on liquefied resin taking the shape of a cavity.

Non-injection molding processes such as compression molding enable the use of much longer fibers such as those in the dimensional ranges noted above. The panel can thus be made with long natural fibers reinforcing the matrix material to acquire high stiffness normally associated with continuous glass fiber-reinforced polymers, but with significantly lower cost and weight. In various embodiments, the panel 10 is a compression molding panel as presented to the laser engraving processes and may thus be already shaped to have a three-dimensional contour desired for use in the vehicle interior before engraving. In steps preceding the engraving process, a flat sheet of the composite material can be shaped to a three-dimensional contoured substrate layer 20 in a compression molding step and the film layer 18 can be thermally bonded to the substrate layer 20. These steps can occur sequentially or simultaneously in the same or different molds to provide the panel to the engraving process as a laminated natural fiber composite. Suitable natural fiber composite panels are available under the trade name Ligneco (Faurecia, Auburn Hills, Mich., USA).

As noted above, natural fiber containing materials have typically been relegated to underlying substrate-type materials because of their environmental sensitivity. It has now been found that a laser engraving process such as that illustrated in FIGS. 2 and 3 can be configured to expose the substrate layer 20 as a visible and decorative portion of the interior panel. This can be accomplished via cauterization of the natural fibers of the composite material, which can be performed as part of the engraving process.

Figure 4:
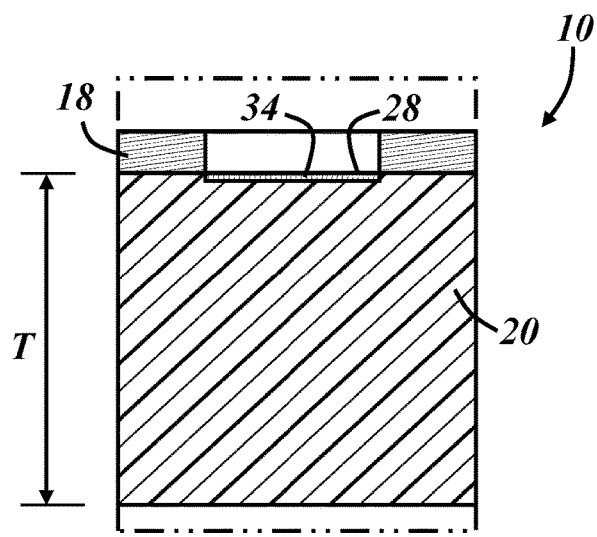
FIG. 4 is an enlarged view of a portion of FIG. 3, illustrating a cauterized portion of the panel.

FIG. 4 is an enlarged view of a portion of FIG. 3 and illustrates a cauterized portion 34 as the visible portion 28 of the substrate layer 20. As used herein, cauterization is a surface treatment in which at least some high-energy chemical bonds of a natural organic fiber are removed and/or converted to relatively lower energy chemical bonds. For example, double or triple covalent bonds involving carbon may be eliminated in favor of lower energy single covalent bonds or elemental carbon. The cauterized portion 34 is therefore less chemically reactive with environmental oxygen, more resistant to UV light, and is less likely to form free-radicals. Cauterization may also be referred to as surface deactivation. One characteristic of the cauterized portion 34 of the substrate layer 20 may be a higher carbon content and a correspondingly lower hydrogen and oxygen content than uncauterized portions. Another characteristic of the cauterized portion 34 may be increased hydrophobicity compared to uncauterized portions, which is thought to be due in part to the lower surface energy and reduced number of polar bonds. The reduced tendency of the natural fibers to absorb water, which can be detrimental to the natural fibers both structurally and dimensionally, is one unexpected advantage of cauterization.

Cauterization is also an energy-negative process, which is to say that the reduced surface energy and the greater proportion of low energy bonds in the cauterized portion is surprisingly induced by the addition of energy to the exposed portion of the substrate layer. While previously known surface treatments such as plasma, flame, or corona treatments are commonly used to increase the surface energy of low surface energy plastics such as polyolefins to promote adhesion of coatings or adhesives, cauterization has the opposite effect of reducing surface energy by the addition of energy. While not intending to be bound by theory, this is believed to be due in part to the focused high energy density available from a laser beam.

In the illustrated examples, the same laser beam is used for engraving and for cauterization. The laser beam is necessarily configured to vaporize the solid material of the film layer 18, such as a synthetic polymer. The significantly more complex organic molecules of natural fibers are not vaporized by such a laser beam. Rather, while some vapor may be produced, the net effect includes carbonization and possible oxidation of the natural material, as noted above. The thickness (T) of the substrate layer 20 may therefore remain the same before and after the engraving and cauterization process.

Cauterization may thus be considered controlled burning of the natural fibers of the exposed portion of the substrate layer 20. However, preferred embodiments of the process result in the visible portion 28 of the substrate layer 20 being uncharred, which is to say that the visible portion is not blackened and there is no visually perceptible carbon residue at the cauterization portion 34. While there may be some color change from the original color of the substrate layer 20, the resulting color is more stable that the original color. The minimal thickness of the cauterized portion 34 also minimizes the amount of color change from the original color. And because the only color the end user ever perceives is the color of the cauterized portion, which is a stable color, the difference in color from the original (i.e., the non-visible portion) is inconsequential. The effect is analogous to the manner in which a chromium coating prevents oxidation of underlying metal: by forming a thin layer of oxidized chromium that is impervious to oxygen.

In some embodiments, the laser beam is a non-pulsed laser. As used herein, a non-pulsed laser is a laser with a duty cycle in a range from 1% to 100%, where the duty cycle is the fraction of time the laser source is "on" so that the laser beam is impinging the workpiece while proceeding along the graphic pattern. In the art of lasers, pulsed lasers typically refer to Q-switched or other high-pulse frequency (e.g., on the kHz scale) lasers with very short pulse duration (e.g., on the nanosecond or shorter scale). Pulsed lasers therefore typically have a duty cycle on the order of 0.0001% or less and are usually used in applications such as the above-noted process of Chin et al., where great care is taken to avoid and damage or change to the material adjacent to the removed material. While it may be possible to configure pulsed lasers for cauterization, cauterization by definition requires modification of the structure of unremoved material. A $CO_2$ laser is one suitable type of laser. In some embodiments, the laser beam is delivered to the panel in pulses that are each longer than a microsecond. It may be possible to engrave and/or cauterize with other types of focused beams, such as an ion beam or electron beam.

In some embodiments, the degree of cauterization at one part of the pattern is greater than at another different part. The resulting graphic image in the example of FIG. 1 may for example have a color gradient in the x- and/or y-direction. A higher degree of cauterization means that the atomic quantity of carbon in the cauterized portion is higher. A higher degree of cauterization may be achieved by increasing the duty cycle or power of the laser beam and/or by reducing the speed with which the laser beam is moved with respect to the panel 10.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of making an interior panel of a vehicle, the interior panel having a decorative side that faces an interior of a passenger cabin of the vehicle when installed in the vehicle, the method comprising the steps of:
    (a) providing a panel comprising a substrate layer and a film layer bonded to the substrate layer, wherein the substrate layer is formed from a composite material comprising natural fibers dispersed in a polymeric matrix material; and
    (b) directing a laser beam at the film layer and along a pattern defined along the panel to locally remove an entire thickness of the film layer from the panel and expose a surface of the substrate layer along the pattern to thereby form the decorative side of the interior panel,
    wherein the laser beam is configured to cauterize the natural fibers at the exposed surface of the substrate layer, and
    wherein, after step (b), the interior panel comprises:
        the substrate layer formed from the composite material;
        the film layer bonded to the substrate layer, the film layer having a decorative side that faces away from the substrate layer and being visible in the interior of a passenger cabin of the vehicle when the interior panel is installed in the vehicle; and
        a cut-out formed through the film layer in said pattern,
        wherein the substrate layer has a visible portion located in and visible through the cut-out, and
        wherein the natural fibers of the composite material are cauterized at the visible portion.

2. The method of claim 1, wherein step (a) comprises:
    compression molding the substrate layer from a flat sheet of material comprising the natural fibers and the matrix material, and
    bonding the film layer to the substrate layer by hot compression.

3. The method of claim 1, wherein the laser beam is delivered to the panel in pulses that are each longer than a microsecond.

4. An interior panel of a vehicle, comprising:
    a substrate layer formed from a composite material comprising natural fibers dispersed in a polymeric matrix material;
    a film layer bonded to the substrate layer, the film layer having a decorative side that faces away from the substrate layer and being visible in an interior of a passenger cabin of the vehicle when the interior panel is installed in the vehicle; and
    a cut-out formed through the film layer in a pattern,
    wherein the substrate layer has a visible portion located in and visible through the cut-out, and
    wherein the natural fibers of the composite material are cauterized at the visible portion.

5. An interior panel as defined in claim 4, wherein the pattern is not an imitation of a naturally occurring pattern.

6. An interior panel as defined in claim 4, wherein:
    the substrate layer and the film layer together form a compression molded layer having generally parallel opposite faces,
    the matrix material is a thermoplastic material and is present in the composite material in an amount from 40% to 60% by weight,
    the natural fibers are bast fibers and are present in the composite material in an amount from 40% to 60% by weight and range in length from 50 mm to 150 mm, and
    the film layer is formed from a thermoplastic material and has a thickness in a range from 50 µm to 300 µm and less than 10% of a thickness of the compression molded layer.

7. An interior panel as defined in claim 6, wherein the thermoplastic material of the matrix material and the thermoplastic material of the film layer are polypropylene-based materials.

8. An interior panel as defined in claim 6, wherein the substrate layer includes oppositely facing first and second sides, the film layer is bonded to the first side of the substrate layer so that the decorative side of the film layer faces the interior of the passenger cabin, and no film layer is bonded to the second side of the substrate layer.

9. An interior panel as defined in claim 4, wherein the natural fibers are plant fibers having an elongated shape and the matrix material is a thermoplastic material.

10. An interior panel as defined in claim 4, wherein the natural fibers are bast fibers ranging in length from 30 mm to 150 mm.

11. An interior panel as defined in claim 4, wherein the matrix material comprises a polyolefin and the film layer comprises the polyolefin.

12. An interior panel as defined in claim 4, wherein the film layer has a thickness in a range from 50 μm to 300 μm and less than 10% of a thickness of the panel.

13. An interior panel as defined in claim 4, wherein the substrate layer has a thickness along the pattern that is the same within the pattern and outside the pattern.

14. An interior panel as defined in claim 4, wherein the panel is a compression molded panel.

15. An interior panel as defined in claim 4, wherein the natural fibers are present in the composite material in an amount from 40% to 60% by weight, and the polymeric matrix material is present in the composite material in an amount from 40% to 60% by weight.

16. An interior panel as defined in claim 4, wherein the natural fibers at one portion of the visible portion of the substrate layer are cauterized to a greater degree than at another different portion of the visible portion of the substrate layer.

* * * * *